June 30, 1953 D. RICHMAN 2,644,081

LOGARITHMIC-MODE SEPARATELY QUENCHED SUPERREGENERATIVE AMPLIFIER

Filed May 22, 1948

*INVENTOR.*
DONALD RICHMAN

BY John A. Harvey

ATTORNEY

Patented June 30, 1953

2,644,081

UNITED STATES PATENT OFFICE 2,644,081

LOGARITHMIC-MODE SEPARATELY QUENCHED SUPERREGENERATIVE AMPLIFIER

Donald Richman, Flushing, N. Y., assignor to Hazeltine Research, Inc., Chicago, Ill., a corporation of Illinois Application May 22, 1948, Serial No. 28,597

2 Claims. (Cl. 250—20)

Figure 2:
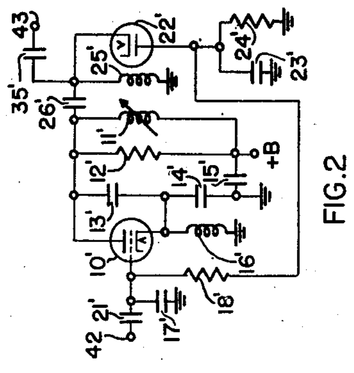

The present invention is directed to logarithmic-mode separately quenched superregenerative amplifiers. Such amplifiers are subject to a wide variety of applications, but are especially valuable as wave-signal receivers for deriving the modulation components of a received amplitude-modulated or frequency-modulated wave signal. The unusually high sensitivity of the superregenerative amplifier makes it especially useful for receiver applications and, for convenience, the invention will be described in detail in that connection.

Superregenerative amplifiers of the type under consideration comprise a regenerative oscillatory circuit and a separate source which supplies a periodic quench signal to the regenerative circuit. The quench signal, as is well understood in the art, causes the conductance of the regenerative circuit to undergo cyclic variations between negative and positive values. In any negative-conductance interval, oscillations are generated in the regenerative circuit and they are quenched or damped in the next succeeding interval of positive conductance. As a result of the periodic generation of oscillations, the amplifier produces recurring bursts or pulses of high-frequency oscillations and some characteristics (the phase, pulse duration, or the like) of the oscillations are related to the modulation of a modulated wave signal applied to the amplifier for amplification. The characteristic variations of these oscillations may be detected in a variety of known ways to derive the modulation components of the amplified modulated wave signal.

In logarithmic-mode operation, as practiced heretofore, the oscillations generated in any quench cycle attain saturation-level amplitude before the regenerative circuit enters upon an interval of positive conductance during which the oscillations are damped. As an incident to the generation of saturation-level oscillations, the regenerator tube draws control-electrode or grid current, rectifying on the peaks of the generated oscillations. This rectifying action, which is characteristic of conventional logarithmic-mode separately quenched superregenerative amplifiers, introduces several undesirable effects. For example, a blocking potential is developed in the amplifier because the rectification charges the condenser customarily included in the control-electrode circuit. The blocking potential may discharge at a very slow rate through the usual leak resistor provided for the condenser and may cause the amplifier to subdivide on the quench signal. In other words, the blocking potential may be dissipated so slowly that it is able to hold the regenerator tube blocked throughout a quench cycle and thus the amplifier may fail to oscillate in every cycle of the quench signal. It is also found that the control-electrode circuit blocking effect may tend to terminate the oscillation interval of the superregenerative amplifier too early in the quench cycle. Where that effect is encountered, the modulation output of the amplifier is undesirably reduced in intensity.

Moreover, when the oscillations in any quench cycle are permitted to reach saturation-level amplitude, radiation from the amplifier is large and the circuit operation is essentially nonlinear. The nonlinearity causes the amplifier to generate components harmonically related to the oscillatory frequency, and having appreciable energy, which are also radiated. This, of course, is undesirable because radiation is to be minimized to reduce any possibility of interference on the part of the amplifier with other near-by electronic apparatus.

Some attempts have been made to overcome the aforementioned limitations of conventional separately quenched logarithmic-mode superregenerative amplifiers. It has been proposed, for example, that an auxiliary time-constant circuit be included in the control-electrode circuit, having a low impedance at the oscillatory frequency of the amplifier and having a time constant short relative to the quench period to minimize control-electrode current and the tendency to subdivide on the quench signal. However, it is found that the use of a short time constant in the control-electrode circuit is undesirable for the reason that it reduces the modulation output of the amplifier which is most objectionable when the amplifier concurrently serves as a wave-signal detector. It has also been suggested that the quench signal be supplied from a low-impedance source in an effort to avoid subdividing on the quench signal, but in general a low-impedance source is too costly and frequently difficulty is experienced in obtaining the desired wave form of the quench signal.

It is an object of the present invention, therefore, to provide a logarithmic-mode separately quenched superregenerative amplifier which avoids one or more of the aforementioned limitations of prior superregenerative amplifying arrangements.

It is another object of the invention to provide a logarithmic-mode separately quenched superregenerative amplifier having an improved arrangement for limiting the oscillation amplitude to a value less than saturation-level amplitude of the regenerative oscillatory circuit.

It is another object of the invention to provide a logarithmic-mode separately quenched superregenerative amplifier having a simplified and improved amplitude-limiting and stabilizing arrangement to limit the oscillation amplitude to a value less than saturation-level amplitude of the regenerative circuit and to stabilize the average duration of the oscillation intervals.

It is an additional object of the invention to provide a logarithmic-mode separately quenched superregenerative amplified having an improved amplitude-limiting arrangement for preventing the occurrence of control-electrode current in the regenerator tube.

It is a further object of the invention to provide an improved superheterodyne superregenerative wave-signal receiver having reduced radiation.

In accordance with the invention, a logarithmic-mode separately quenched superregenerative amplifier comprises a regenerative oscillatory circuit and a quench signal source coupled to the regenerative oscillatory circuit and external thereto and so proportioned as to supply a periodic quench signal of such magnitude and periodicity to that circuit as to effect the periodic generation in the regenerative circuit of oscillations having substantially the frequency of the regenerative circuit and characteristic of logarithmic-mode superregenerative amplification. The amplifier further includes a multi-electrode vacuum tube having a control electrode and a cathode and including an amplitude-limiting damping and stabilizing arrangement including a condenser and including the aforesaid control electrode and cathode as a rectifier in a series circuit with the condenser and so coupled across the regenerative circuit that the rectifier is responsive to the aforesaid oscillations and that the arrangement produces therefor a low impedance across the regenerative circuit during conductive intervals of the rectifier. A resistor is included in the aforesaid arrangement and is connected in parallel with the condenser and has a value of resistance much greater than the conductive direction impedance of the series circuit, the aforesaid amplitude-limiting arrangement having a dynamic positive conductance at least equal to the negative conductance of the regenerative circuit at an oscillation-amplitude level less than saturation-level amplitude of the regenerative circuit which damps the regenerative circuit and limits the amplitude of oscillations to the aforesaid oscillation-amplitude level. The condenser and the resistor are so proportioned as to have a time constant which is at least as great as the period of the quench signal. The amplifier further includes means for applying a potential developed across the aforesaid condenser and the resistor to the regenerative circuit to stabilize the average duration of the maximum amplitude-oscillation intervals of the regenerative circuit.

For a better understanding of the present invention, together with other and further objects thereof, reference is had to the following description taken in connection with the accompanying drawing, and its scope will be pointed out in the appended claims.

Figure 1:
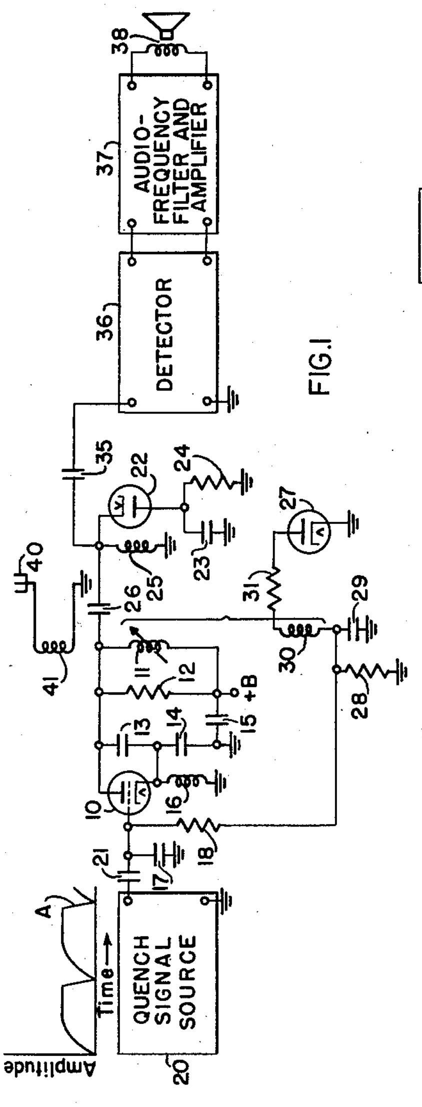
Figure 3:
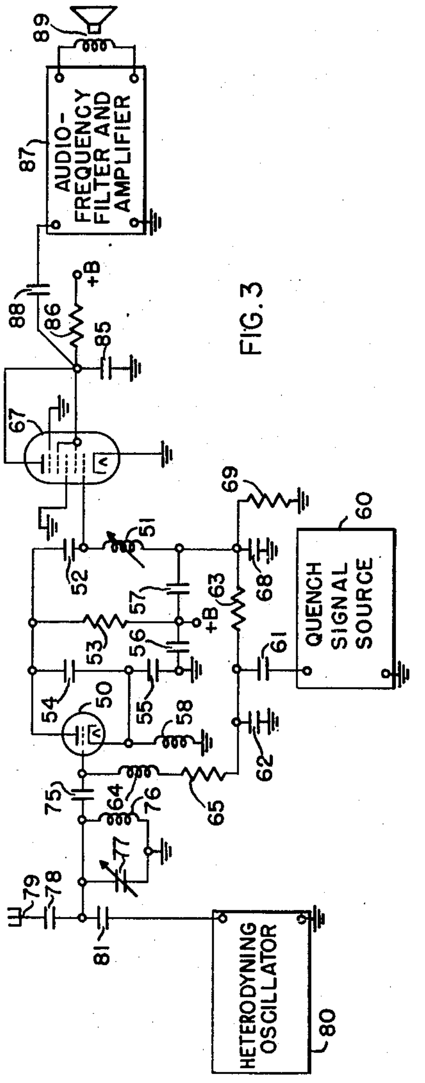

In the drawing, Fig. 1 is a circuit diagram partly schematic of a complete wave-signal receiver embodying the present invention in one form; Fig. 2 is a circuit diagram representing a portion of the receiver of Fig. 1 featuring a modified form of the invention; and Fig. 3 is a representation of a superheterodyne superregenerative wave-signal receiver utilizing the invention in an additionally modified form.

Referring now more particularly to Fig. 1, the wave-signal receiver there represented includes a logarithmic-mode separately quenched superregenerative amplifier constructed in accordance with the instant invention. As shown, the amplifier comprises a regenerative oscillatory circuit of the Colpitts type. Specifically, the oscillatory circuit is provided by a triode vacuum tube 10 having the usual anode, cathode and control electrodes associated with a frequency-determining circuit. The frequency-determining circuit includes an adjustable inductor 11, a damping resistor 12, and a capacitive voltage divider provided by condensers 13, 14, and 15. Tuning of the oscillatory circuit is accomplished by adjustment of the inductor 11. The damping resistor 12 is usually selected so that the damping of the regenerative circuit is less than critical but nevertheless sufficient to avoid carry-over or hang-over effects. That is to say, the amount of damping is usually so selected that the oscillations generated in any quench cycle of the superregenerative amplifier are damped to a value such that they have no appreciable effect on the oscillations generated in the next succeeding quench cycle.

The anode of the tube 10 is directly connected to one side of the described frequency-determining circuit and the other side of the latter coupled to ground through the condenser 15. The cathode of the tube is connected to the junction of the condensers 13 and 14 and is coupled to ground through a radio-frequency choke coil 16. The control electrode is coupled to ground through a condenser 17 to complete the alternating-current paths of the oscillatory circuit. A source of excitation potential, indicated +B, is coupled to the anode of the tube 10 through the inductor 11 and is by-passed for signal frequencies by the condenser 15.

A quench signal source 20 is associated with the regenerative circuit for supplying a periodic quench signal thereto to effect the periodic generation of oscillations in the regenerative circuit characteristic of logarithmic-mode superregenerative amplification. The quench source is coupled to the input circuit of the tube 10 through a condenser 21 and supplies a quench signal which may have its wave form suitably shaped by a wave-shaping network comprising the condenser 17 in combination with a resistor 18. The curve A, positioned immediately above the quench signal source 20, represents the amplitude time characteristic of a suitable form of quench signal applied to the control electrode of the tube 10 to achieve logarithmic-code superregenerative amplification.

In order to avoid control-electrode rectification and, therefore, the deleterious effects of control-electrode current in the superregenerative amplifier, the receiver under consideration further comprises an amplitude-limiting arrangement which is effectively coupled across the described regenerative circuit. This arrangement includes a diode or two-element rectifier 22 and a condenser 23 connected in a series circuit which has, during the conductive interval of the rectifier, a low impedance at the oscillatory frequency of the regenerative circuit. A resistor 24 is connected in parallel with the condenser 23 and has a value of resistance much greater than the impedance of the series circuit 22, 23 during conductive intervals of the rectifier. The load circuit of the rectifier 22 is completed by a radio-frequency choke coil 25, and a coupling condenser 26 serves to couple the rectifier and its series condenser 23 across the frequency-determining circuit 11—15 of the regenerative circuit.

A second rectifying system is coupled to the regenerative circuit to effect stabilization of certain operating characteristics of the amplifier as will be considered more particularly hereinafter. This second rectifying system comprises a second diode rectifier 27 and a resistance-capacitance load circuit including a resistor 28 and a condenser 29. The rectifying system additionally includes an inductor 30, which is inductively coupled with the inductor 11 of the frequency-determining circuit 11—15 of the amplifier, as well as a series resistor 31 having such value that this rectifying system is a high-impedance circuit as compared with the first described rectifying system including the diode 22. The high-potential terminal of the resistor-condenser combination 28, 29 is connected through the resistor 18 to the control electrode of the tube 10 so that a control potential developed by that combination is applied as an operating bias potential to the regenerator tube.

A condenser 35 couples a detector 36, of the averaging type, to the regenerative circuit so that the oscillations generated in the oscillatory circuit may be detected to derive the modulation components of a modulated wave signal applied to the amplifier. An audio-frequency filter and amplifier 37 is coupled to the output circuit of the detector 36, and a sound-signal reproducing device 38 is connected to the output terminals of the audio-frequency amplifier. An antenna-ground system 40, including an inductor 41 inductively coupled to the inductor 11 of the frequency-determining circuit 11—15, constitutes means for intercepting modulated wave signals for application to the regenerative amplifier.

In considering the operation of the described receiver, the functions of the circuits including the rectifiers 22 and 27 will be neglected momentarily and it will be assumed that the antenna system 40 intercepts and applies to the amplifier an amplitude-modulated wave signal for amplification and detection. The quench signal of curve A is applied to the control-electrode circuit of the tube 10 by the separate quench signal source 20. This quench signal controls the conductance of the regenerative circuit, including the tube 10, causing the conductance to experience recurring cycles of variations between positive and negative values. In any operating interval in which the circuit conductance has a negative value, oscillations are generated starting with an initial amplitude that is related primarily to the amplitude of the received modulated wave signal at the period of maximum sensitivity of the amplifier. Maximum sensitivity occurs when the conductance of the regenerative circuit has an essentially zero value in a transition from a positive to a negative value. The oscillations generated in a particular interval of negative conductance reach a maximum amplitude level in a time which is dependent upon the initial oscillation amplitude. Thereafter, the oscillations continue at a fixed amplitude level throughout the remainder of the oscillatory interval. At the end of that interval, the quench signal causes the regenerative circuit to have a positive conductance and the oscillations which have been generated are damped or quenched. This process of generating and quenching oscillations is repeated at the frequency of the quench signal and, as a consequence, bursts or pulses of oscillations having a frequency corresponding to the oscillatory frequency of the regenerative circuit are produced. Since the time at which the oscillations of any quench cycle reach maximum amplitude is related to the amplitude of the received modulated wave signal at the maximum sensitivity period of the particular quench cycle, the successive pulses of oscillations have a pulse width or duration that varies with the modulation of the received amplitude-modulated wave signal. These oscillations are detected in the detector 36, which derives the modulation components of the received signal for application to the audio-frequency amplifier 37. After amplification therein, the modulation components are supplied to and reproduced by the sound-signal reproducing device 38.

The foregoing description of the receiver operation is generally the same as that of conventional logarithmic-mode separately quenched superregenerative receivers neglecting, of course, any considerations of control-electrode current in the regenerator tube. While control-electrode current is experienced in conventional superregenerative receivers as previously explained, the amplitude-limiting arrangement of the present invention avoids such current and its deleterious effects. The operation of the amplitude limiter to accomplish that result is as follows.

The resistor-condenser combination 23, 24 is in the nature of a self-biasing circuit for the rectifier 22 because the potential developed by that combination is an amplitude-delay bias for the rectifier. In any oscillation interval of the regenerative circuit, the oscillations are permitted to build up in amplitude until a level is reached which exceeds the delay bias of the rectifier 22. At that time the rectifier becomes conductive. When the rectifier is conductive, its low impedance substantially damps or loads the resonant circuit 11—15 to reduce the net value of negative conductance of the regenerative circuit approximately to zero value and thus ensures that the oscillations do not further increase in amplitude by any appreciable extent. The value of the resistor 24 is much greater than the conductive impedance of the diode rectifier 22 and is so selected that the damping applied to the regenerative circuit during conductive intervals of the rectifier is sufficient to limit the maximum amplitude of oscillations to a value less than the saturation-level amplitude which the regenerative circuit itself otherwise would have. Expressed somewhat differently, the value of the resistor 24 is such that the dynamic positive conductance of the amplitude-limiting arrangement is at least equal to the negative conductance of the regenerative circuit at an oscillation-amplitude level less than saturation-level amplitude of the regenerative circuit. This is so because, as stated previously, when the rectifier 22 is conductive, the net value of the conductance of the regenerative circuit, including the dynamic conductance of the amplitude-limiting arrangement, is approximately zero. The dynamic conductance of the amplitude-limiting arrangement is the reciprocal of the dynamic impedance thereof. The expression "saturation-level amplitude of the regenerative circuit" is here used to define that amplitude level at which control-electrode rectification occurs in the regenerator tube 10 rather than the maximum amplitude of oscillation of which the regenerative circuit is capable. It is desirable that the rectifier 22 be nonconductive throughout the initial build-up interval of the oscillations produced in any quench cycle to permit the duration of the oscillation intervals to reflect the effect of the modulation of the received amplitude-modulated wave signal. This is obtained by selecting the condenser 23 of such a value as to provide with the resistor 24 a time constant which is at least of the same order of magnitude as the period of the quench signal. Usually, this time constant is long compared with the period of the quench signal but there is considerable latitude allowable in the selection of its value. It may, for example, be advantageous to have the time constant approximately equal to the period of the lowest modulation frequency of the received signal or it may even be less than the quench period, although it preferably should be at least equal to one-third that period.

The second rectifying system including the diode 27 also receives the oscillations generated by the regenerative circuit and rectifies them to develop a control potential in the circuit network 28, 29. This rectifier functions as an averaging rectifier so that the amplitude of the potential developed by the resistor-condenser combination 28, 29 varies with the average duration of the maximum-amplitude oscillation intervals of the regenerative circuit. If the average duration of these intervals should increase, the negative potential developed by the resistor-condenser combination 28, 29 and utilized as an operating bias for the regenerator tube 10 increases. The increase in operating bias increases the oscillation build-up time of the regenerative circuit and thereby reduces the average duration of the maximum-amplitude oscillation intervals. Conversely, if the average duration of the latter intervals decreases, the operating bias developed by the combination 28, 29 is decreased and the oscillation build-up time is reduced to increase the pulse width. In this manner the average pulse width of the generated oscillations, which is the same as the average duration of the maximum-amplitude oscillation intervals of the regenerative circuit, is stabilized at a substantially constant value.

It has been pointed out that the pulse width of the generated oscillations varies with the modulation of the received signal for the application under consideration. It is desirable that the operation of the stabilizing diode 27 be such as to avoid degeneration at the modulation-signal frequencies to prevent reducing the audio output of the receiver. Consequently, the resistor-condenser combination 28, 29 is selected to have a time constant which is at least equal to the period of the lowest modulation-frequency component of the modulated signal being received.

The receiver of Fig. 1 has been described in connection with the reception of an amplitude-modulated wave signal. When so used, the oscillatory frequency of the regenerative circuit is chosen to correspond with the carrier frequency of the received signal. The present receiver may likewise be used for the reception of a frequency-modulated wave signal by utilizing the technique of side tuning to the received signal. In that case, the time constant presented by the elements 28, 29 is selected as already indicated to avoid audio-frequency degeneration. In some frequency-modulation applications, the regenerative circuit is tuned to the mean frequency of the received wave signal and the phase of the oscillations produced in succeeding quench cycles by the regenerative circuit is detected in a phase detector to derive the modulation components of the received signal. When this phase type of frequency-modulation reception is utilized, the time constant of the elements 28, 29 may be made short to provide degeneration for amplitude modulation that may be superimposed on the frequency-modulated signal. Preferably, the time constant is then sufficiently short to remove all amplitude modulation of the received signal.

The arrangement of Fig. 2 represents an amplifier having a regenerative oscillatory circuit which is generally similar in construction to the corresponding portion of the receiver of Fig. 1 and like components thereof are designated by similar reference characters primed. In this modification, however, the functions of amplitude limiting and pulse-width stabilization are accomplished by the single rectifier 22′. For convenience, the terminal 42 designates the point to which the quench signal source may be connected and a terminal 43 represents the point to which the detector 36 and the audio-frequency system may be connected. Thus, it is apparent that the arrangement of Fig. 2 may be substituted for the regenerative circuit, the amplitude-limiting system including the rectifier 22, and the stabilizing system including the rectifier 27 of Fig. 1. The series circuit including the rectifier 22′ and the condenser 23′ provides a low impedance at the oscillatory frequency of the regenerative circuit to accomplish a damping function in a manner essentially similar to that described in connection with the Fig. 1 amplifier. Stabilization is obtained by varying the operating bias of the regenerator tube 10′ in accordance with the potential developed across the condenser-resistor combination 23′, 24′. In this modification, during the reception of an amplitude-modulated wave signal, the time constant established by the elements 23′, 24′ is selected to avoid audio-frequency degeneration which means that the time constant should be at least equal to the period of the lowest modulation-frequency component of the received signal.

Stabilization is effected in generally the same manner as described in connection with Fig. 1. Specifically, if the pulse width should tend to vary due to a change in the transconductance of the regenerator tube 10′, the potential developed in the load circuit 23′, 24′ changes correspondingly. This causes a variation in the operating bias of the regenerator tube 10′ in a degenerative sense to stabilize the regenerative system and tend to maintain a substantially constant average pulse width. In the modification under consideration, the stabilizing feature also tends to maintain the amplitude-limiting level at a substantially fixed value by stabilizing the value of the amplitude-delay bias which the network 23′, 24′ applies to the rectifier 22′.

The amplitude-limited superregenerative amplifier of Fig. 2 may also be used in a frequency-modulation receiver of the phase type referred to above in which the oscillations from the regenerative circuit are supplied to a phase detector. In that use of the regenerative circuit with amplitude limiting, the time constant of the load circuit 23', 24' is governed principally by the limiting function. To achieve limiting, that time constant has a value which is at least of the same order of magnitude as the quench period. In other words, the time constant is essentially the same as that described for the limiting system which includes the rectifier 22 in the arrangement of Fig. 1.

The present invention is especially useful in a superheterodyne superregenerative wave-signal receiver of the type described and claimed in an application of Bernard D. Loughlin, Serial No. 788,570, filed November 28, 1947, now Patent 2,588,022 granted March 4, 1952. As represented in Fig. 3, such a receiver includes a regenerative oscillatory circuit. This circuit includes a vacuum tube 50 of the triode type and a frequency-determining circuit 51—57 which is associated with the tube 50 in the usual way to constitute a Colpitts type of oscillatory circuit. The cathode of the tube 50, in addition to being connected to the frequency-determining circuit, is grounded through an intermediate-frequency choke coil 58. The quench signal source 60 is coupled to the regenerative circuit through a condenser 61 and wave shaping of the applied quench signal is effected principally by a condenser 62 and a resistor 63 included in the input circuit of the tube 50. This circuit further includes a radio-frequency choke coil 64 and a damping resistor 65 provided to suppress ringing oscillations.

The limiting and stabilizing arrangement is much the same as that of Fig. 2, including a rectifier provided by the input electrodes of a multi-electrode tube shown as a heptode converter 67 connected as a triode. The series condenser of the limiting and stabilizing arrangement is designated 68 and a load resistor 69 is connected in parallel with this condenser. The time constant provided by the elements 68 and 69 should be at least of the same order of magnitude as the quench period, for example at least as great as the quench period, so that the amplitude-limiting function may be realized as explained in connection with the arrangement of Fig. 2. Where it is necessary to avoid audio-frequency degeneration, this time constant should be at least equal to the period of the lowest modulation-frequency component of the modulated wave signal to be translated. The connection from the high-potential terminal of load circuit 68, 69 of the limiting and stabilizing rectifier through the elements 63—65 to the control electrode of the regenerator tube 50 constitutes means for utilizing a control potential developed by the time-constant circuit as a stabilizing bias potential for the amplifier.

An input selector is coupled through a condenser 75 to the control electrode of the regenerator tube 50, the selector comprising the parallel combination of an inductor 76 and an adjustable condenser 77. This selector is coupled through a condenser 78 to an antenna 79 to select a desired wave signal which may be intercepted by the antenna. A heterodyning oscillator 80 is also coupled to the input circuit of the regenerator tube 50 through a coupling condenser 81 to provide the heterodyning signal which is characteristic of superheterodyne reception.

An integrating circuit including a condenser 85 and a resistor 86 is provided in the effective anode circuit of the hexode tube 67 (formed by connecting the usual anode and the screen) so that, by integration of the effective anode-current pulses of that tube, the modulation components of a received modulated signal may be derived. An audio-frequency filter and amplifier 87 is coupled through a condenser 88 to the integrating circuit to select the audio-frequency components for further amplification and reproduction by a sound-signal reproducing device 89.

The superheterodyne superregenerative receiver of Fig. 3 is generally similar to that represented in Fig. 1 of the Loughlin patent earlier referred to and reference may be had to that patent for a complete consideration of such a receiver. The operation of the receiver will be reviewed here only briefly. It will be assumed that an amplitude-modulated wave signal is intercepted by the antenna 79 for translation and reproduction by the receiver. That signal is selected by the selector 76, 77 and supplied along with the heterodyning signal from the oscillator 80 to the input circuit of the regenerator tube 50. The tube 50 exhibits a nonlinear translating characteristic during the initial part of each oscillatory build-up interval, this interval occurring under control of the quench signal supplied by the source 60 to control the conductance of the regenerative circuit. This nonlinear characteristic effects a heterodyning of the received signal, selected by the input selector 76, 77, and the heterodyning signal generated by the heterodyning oscillator 80. By virtue of the heterodyning action, an intermediate-frequency signal is derived in the output circuit of the regenerator tube 50. The frequency-determining circuit 51—57, which is included in the output circuit of the tube 50, is tuned to that intermediate-frequency signal and responds thereto.

As the conductance of the regenerative circuit is varied alternately between negative and positive values by the quench signal supplied from the source 60, the derived intermediate-frequency signal is subjected to logarithmic-mode superregenerative amplification. In each oscillatory interval of the superregenerative amplifier, the signal applied from the frequency-determining circuit 51—57 to the input circuit of the hexode tube 67 builds up in amplitude and ultimately exceeds the delay bias established by the resistor-condenser combination 68, 69. At that point in the oscillatory interval, the applied signal is rectified in the input circuit of the tube 67 utilizing the control electrode thereof as a rectifier anode. During conductive intervals of the control-electrode circuit, damping is applied to the regenerative oscillatory circuit to limit the maximum oscillation amplitude thereof to a value less than saturation-level amplitude of the regenerative circuit. This limiting operation is essentially the same as that previously described in connection with the embodiments of Figs. 1 and 2. The rectification by the amplitude-limiting rectifier circuit also develops a bias potential in the circuit 68, 69 which is applied through the elements 63—65 to the control electrode of the regenerator tube 50 to stabilize the average pulse width of the regenerative circuit.

It is apparent that rectification in the input circuit of the tube 67 is of a pulsed nature because the rectifier conducts only when the oscillations of any quench cycle build up in amplitude to a value exceeding the delay bias established in the rectifier circuit by its resistor-condenser combination 68, 69. While the average pulse width of the generated oscillations and, therefore, the average conductive interval of the rectifier are stabilized at an approximately constant value, the dynamic pulse width and the dynamic conductive interval of the rectifier in any particular quench cycle vary in accordance with the modulation of the received amplitude-modulated wave signal. Accordingly, the anode-cathode current of the tube 67 is pulse modulated and varies with the amplitude modulation of the received signal. The anode-current pulses of the tube 67 are integrated by the components 85, 86 to develop the modulation components which are supplied to and selected by the audio-frequency amplifier 87. After amplification therein, the modulation components are delivered to and reproduced by the sound-signal reproducing device 89. The amplification provided by the hexode tube 67 ensures a high level output from this superheterodyne superregenerative receiver. At the same time, the amplitude-limiting and stabilizing rectifier, including the input electrodes of the tube 67, limits the oscillation level of the regenerative circuit to a value less than saturation-level amplitude of the regenerative circuit to avoid control-electrode rectification and control-electrode current flow in the regenerator tube 50.

A superheterodyne superregenerative receiver embodying the Fig. 3 form of the invention and found to have practical utility included the following circuit constants and parameters:

| | |
|---|---|
| Tube **50** | 1/2 of a Type 12AT7 |
| Tube **67** | Type 12BE6 |
| Resistor **53** | 15,000 ohms |
| Resistor **63** | 100,000 ohms |
| Resistor **65** | 10 ohms |
| Resistor **69** | 120,000 ohms |
| Resistor **86** | 220,000 ohms |
| Condenser **52** | 1,000 micromicrofarads |
| Condensers **54**, **55** | 15 micromicrofarads |
| Condensers **56**, **57** | 5,000 micromicrofarads |
| Condenser **61** | 0.01 microfarad |
| Condenser **62** | 3,000 micromicrofarads |
| Condenser **68** | 10 microfarads |
| Condenser **75** | 200 micromicrofarads |
| Condensers **78**, **81** | 2 micromicrofarads |
| Condenser **85** | 6,000 micromicrofarads |
| Condenser **88** | 0.02 microfarad |
| Resonant frequency of circuit **51**—**57** | 27.75 megacycles |
| Tuning range of input selector **76**, **78** | 88–108 megacycles |
| Tuning range of heterodyning oscillator **80** | 115.75 to 135.75 megacycles |
| Quench frequency | 23 kilocycles |
| Potential of source +B | +100 volts |

Although the receiver of Fig. 3 has been particularly described for use in the reception of an amplitude-modulated wave signal, it is capable of deriving the modulation components of a frequency-modulated signal. For the reception of a frequency-modulated wave signal, the superregenerative amplifier may be side tuned to the derived intermediate-frequency signal.

All of the described logarithmic-mode separately quenched superregenerative arrangements feature a dynamic amplitude limiter. The dynamic limiter provides damping for the regenerative circuit to maintain the oscillation level below that point at which control-electrode current is experienced in the regenerator tube. An unusual feature of all those arrangements is that the damping is variable over the quench cycle. During the intervals of positive conductance, when the oscillations are being quenched, the limiter rectifier is nonconductive and contributes no damping to the regenerative circuit. Moreover, during the initial part of each oscillatory interval, the amplitude-delay bias of the rectifier again causes the rectifier to be nonconductive so that no damping is presented during the important oscillation build-up interval. This permits the pulses of generated oscillations to reflect the effect of the modulation of the received signal, especially in the reception of an amplitude-modulated wave signal or in side-tuned reception of a frequency-modulated signal. At the same time, the limiter rectifier does become conductive as the oscillations approach saturation-level amplitude of the regenerative circuit so that the damping which it affords precludes saturation-level operation in that circuit and thus avoids control-electrode current flow in the regenerator tube.

Since the flow of control-electrode current is obviated, the superregenerative arrangements have no tendency to subdivide on the quench signal. In the modification of Fig. 3, the absence of control-electrode current is very significant because it reduces back conversion and thus undesired radiation at the received signal frequency. Back conversion means modulation in the input circuit of the regenerator tube, modulating the intermediate-frequency signal and the heterodyning signal to produce a signal at the carrier frequency of the modulated signal to which the receiver is tuned.

It is also seen that the stabilizing effect, through which the average pulse width or the average duration of the oscillatory intervals of the regenerative circuit are maintained substantially constant, assures a high modulation-signal output from the receiver.

Additionally, the amplitude-limiting action reduces undesired radiation from the superregenerative receiver and tends to linearize its operation, thereby greatly to reduce radiation of signal components harmonically related to the oscillatory frequency of the regenerative circuit.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A logarithmic-mode separately quenched superregenerative amplifier comprising: a regenerative oscillatory circuit; a quench signal source coupled to said regenerative circuit and external thereto and so proportioned as to supply a periodic quench signal of such magnitude and periodicity to said circuit as to effect the periodic generation in said circuit of oscillations having substantially the frequency of said regenerative circuit and characteristic of logarithmic-mode superregenerative amplification; a multi-electrode vacuum tube having a control electrode and a cathode; an amplitude-limiting damping and stabilizing arrangement including a condenser and including said control electrode and said cathode as a rectifier in a series circuit with said condenser and so coupled across said regenerative circuit that said rectifier is responsive to said oscillations and that said arrangement produces therefor a low impedance across said regenerative circuit during conductive intervals of said rectifier; a resistor included in said arrangement and connected in parallel with said condenser and having a value of resistance much greater than the conductive-direction impedance of said series circuit; said amplitude-limiting arrangement having a dynamic positive conductance at least equal to the negative conductance of said regenerative circuit at an oscillation-amplitude level less than saturation-level amplitude of said regenerative circuit which damps said regenerative circuit and limits the amplitude of oscillations to said oscillation-amplitude level; said condenser and said resistor being so proportioned as to have a time constant which is at least as great as the period of said quench signal; and means for applying a potential developed across said condenser and said resistor to said regenerative circuit to stabilize the average duration of the maximum-amplitude oscillation intervals of said regenerative circuit.

2. A logarithmic-mode superheterodyne superregenerative wave-signal receiver comprising: a regenerative oscillatory system including a received wave-signal input circuit and a heterodyne-signal supply circuit of a frequency different from that of said input circuit and having during any oscillatory build-up interval thereof a nonlinear translating characteristic effective to derive in a circuit portion of said system and from a received wave signal and the heterodyne signal a wave signal having a frequency different from that of said received wave signal, said circuit portion of said system including a resonant circuit substantially tuned to the frequency of said derived wave signal for establishing the free oscillation frequency of said system; a quench signal source coupled to said regenerative system and external thereto and so proportioned as to supply a periodic quench signal of such magnitude and periodicity to said system as to effect the periodic generation in said system of oscillations having approximately said free oscillation frequency and characteristic of logarithmic-mode superregenerative amplification; an amplitude-limiting damping arrangement including a rectifier and a condenser connected in a series circuit and so coupled across said resonant circuit and that said rectifier is responsive to said oscillations and that said arrangement produces therefor a low impedance across said resonant circuit during conductive intervals of said rectifier; and a resistor included in said arrangement and connected in parallel with said condenser and having a value of resistance much greater than the conductive-direction impedance of said series circuit; said amplitude-limiting arrangement having a dynamic positive conductance at least equal to the negative conductance of said regenerative system at an oscillation-amplitude level less than saturation-level amplitude of said regenerative system which damps said regenerative system and limits the amplitude of oscillations to said oscillation-amplitude level; said condenser and said resistor being so proportioned as to have a time constant which is at least as great as the period of said quench cycles.

DONALD RICHMAN.

References Cited in the file of this patent

UNITED STATES PATENTS

| Number | Name | Date |
|---|---|---|
| 1,917,113 | Gunther | July 4, 1933 |
| 2,398,214 | Emerson | Apr. 9, 1946 |
| 2,410,768 | Worcester | Nov. 5, 1946 |
| 2,412,710 | Bradley | Dec. 17, 1946 |
| 2,504,636 | Bradley | Apr. 18, 1950 |
| 2,536,801 | Emerson | Jan. 2, 1951 |

FOREIGN PATENTS

| Number | Country | Date |
|---|---|---|
| 114,153 | Australia | Nov. 13, 1941 |